United States Patent Office 3,218,302
Patented Nov. 16, 1965

3,218,302
SUSPENSION POLYMERIZATION
Sidney Melamed, Elkins Park, Pa., assignor to Rohm & Haas Company, Philadelphia, Pa., a corporation of Delaware
No Drawing. Filed June 8, 1960, Ser. No. 34,635
13 Claims. (Cl. 260—80)

This invention is concerned with a process for the suspension polymerization of one or more monoethylenically or polyethylenically unsaturated compounds in a non-aqueous organic liquid as the continuous phase of the polymerization system. It is particularly concerned with a suspension polymerization system for effecting the addition polymerization of ethylenically unsaturated compounds in which the polymers obtained therefrom are recovered in particulate or granular form. This application is a continuation-in-part of my copending application Serial No. 813,365, filed May 15, 1959, now abandoned.

An important object of the present invention is to provide a method of suspension polymerization using an organic liquid which is essentially non-aqueous as the polymerization medium in which the polymer is recovered in particulate or granular form. Another more particular object within the scope of the invention is to provide a specific suspension polymerization system which is adapted to be carried out at temperatures above the boiling point of water without the necessity to provide pressure equipment. Another ancillary object of the present invention is to provide a process of suspension polymerization adapted to produce in particulate form water-soluble polymers by direct polymerization without the requirement for a special comminution step for reducing an agglomerated mass of polymer to particulate form. Other objects and advantages of the invention will be apparent from the description hereinafter.

In general, the addition polymerization of the present invention is effected in an organic liquid or solvent as the polymerization medium. This organic liquid may be any solvent or mixture of solvents of hydrocarbon-miscible or oil-soluble type, such as a hydrocarbon or a halogenated hydrocarbon, which is substantially immiscible with water, is soluble to the extent of at least about 10% in each of toluene and n-heptane, and is essentially inert toward the reactants. In general, the organic liquid employed for polymerization may be any of such liquids having a boiling point of 40° to 200° C. or higher. Examples of halogenated hydrocarbons include chloroform, carbon tetrachloride, ethylene dichloride, butyl chloride, chlorobenzene, dichlorobenzenes, trichlorobenzenes, chlorinated naphthylenes, chlorinated toluenes, and chlorinated xylenes. The hydrocarbon solvents are generally preferred because of their availability and relative inexpensiveness. Examples include n-hexane, cyclohexane, n-heptane, n-octane, iso-octane, benzene, toluene, and xylene (o-, m-, or p-xylene). Commercially-available hydrocarbon mixtures may be employed such as mineral spirits, gasoline, xylene mixtures, terpenes, solvent naphthas of aromatic, aliphatic, or naphthenic character, alkyl benzenes in which the alkyl group or groups have from 1 to 4 carbon atoms, octane fraction which contain a mixture of octane isomers, and so on. Other solvents that can be used are ethyl dodecyl ether, dodecyl ether of ethylene glycol, and methyl t-dodecyl sulfide. Generally, it is preferred to employ a hydrocarbon liquid medium comprising at least 50% by weight of non-aromatic components, and especially those of aliphatic or paraffinic constitution. It is essential to select the hydrocarbon or other organic liquid medium with the particular polymer to be prepared therein in mind. The liquid medium should be such that the polymer formed is insoluble therein. Thus, since many polymers of esters of acrylic acid, such as methyl or ethyl acrylate, are soluble in chloroform, this organic liquid would not be employed as the polymerization medium for such polymers.

The monomers which may be polymerized in the suspension system of the present invention are mono- and poly-ethylenically unsaturated compounds containing a $CH_2=C=$ group including esters of methacrylic acid, particularly methyl methacrylate, ethyl methacrylate, and other $(C_1-C_4)$-alkyl methacrylates including n-butyl methacrylate, also such esters of acrylic acid as those formed with an alcohol selected from the group consisting of cyclohexanol and $(C_1-C_{18})$-alkanols, such as methyl, ethyl, butyl, dodecyl, and octadecyl alcohols. When the higher alkyl acrylates are polymerized in the system of the present invention, they must be copolymerized with sufficient of a hardening comonomer such as methyl methacrylate or acrylonitrile to provide a copolymer having an apparent second order transition temperature ($T_i$) of at least 30° C. Copolymers having $T_i$ values in the range of 30° to 150° C. or higher can be satisfactorily produced in particulate form in accordance with the present invention. Other monomers which may be polymerized or copolymerized in the system of the present invention include styrene, vinyltoluene, vinyl acetate, and mixtures thereof with vinyl chloride.

One of the outstanding advantages of the process of the present invention is the fact that polymers and copolymers of any of the monomers just named can be produced in particulate form at temperatures of polymerization within a wide range from 40° C. all the way up to 200° C. within the limits of chemical stability of the particular polymer prepared. Thus, the process of the present invention may be employed for the production of atactic polymers of methyl methacrylate at elevated temperatures of 110° to 150° C. or so, which polymers are extremely useful as molding powders because of their greater ease of molding, that is a lower molding temperature may be employed with a given pressure or a lower molding pressure may be employed with a given temperature. The preparation of such atactic methyl methacrylate polymers heretofore was carried out in water which required the use of pressure autoclaves. When the polymers obtained are to be used for molding, they may be mixed with the usual adjuvants, such as pigments, dyes, fillers, reinforcing components, such as glass fibers, mold lubricants, plasticizers, and so on.

Besides the monomers listed above which yield polymers which are insoluble in water, the process of the present invention is extremely useful for the production of water-soluble polymers from acrylamide, methacrylamide, unsaturated acids such as acrylic acid, methacrylic acid, itaconic acid, N-vinyl-2-pyrrolidone, β-ureidoethyl vinyl ether, β-dimethylaminoethyl acrylate, and related monomers. The process of the present invention results in the production of such water-soluble polymers in particulate form directly, avoiding the difficulties of separating water-soluble polymers from aqueous systems as agglomerated masses containing large proportions of entrapped water which must be subjected to prolonged drying before they can be pulverized.

Any of the monomers hereinabove mentioned, whether they produce water-soluble or water-insoluble polymers, can be copolymerized with 0.5% to 50% by weight, based on the total weight of monomers, of a polyethylenically unsaturated compound copolymerizable therewith, such as divinylbenzene, ethylene glycol dimethacrylate, and so on, for the production of particulate, insoluble resins useful for ion-exchange or other separations.

In the execution of the proccess of the present invention, the amount of monomer or mixed monomers within the organic liquid may range from 1 to 60%, but ordinarily the preferred proportion is from 25 to 50% of monomer in the entire system including monomers and solvent medium. The monomers may be soluble in the organic liquid within which the suspension polymerization is carried out, but it is essential that the polymer formed be insoluble in such organic liquid medium. The entire amount of monomer or monomers to be polymerized may be introduced into the organic liquid along with the polymerization initiator and a granulating agent; or the monomers may be gradually added to a solution of the initiator and granulating agent in the organic liquid medium.

Any of the usual polymerization initiators of free-radical type which are soluble in the organic liquid or the monomer may be employed. The particular initiator may be selected in accordance with the temperature in which it is desired to carry out the polymerization. Thus, benzoyl peroxide is suitable at temperatures of 80° to 100° C., t-butyl hydroperoxide and t-butyl peracetate are quite useful at temperatures of 120° to 150° C., and the azo catalysts such as dimethyl azodiisobutyrate and azodiisobutyronitrile may be employed at temperatures of 40° to 100° C. The proportion of free-radical initiator may be from 0.1 to 3% or more by weight, based on the total weight of monomers. Instead of, or in addition to, the initiators mentioned, actinic light, especially ultraviolet, may be used.

Besides the initiator, the polymerization medium should contain a granulating agent. This agent is employed in an amount of 0.1 to 2% by weight, based on the weight of monomers. The time of polymerization may vary from one-half hour to 20 hours or more depending upon the particular monomers, temperature, and initiator employed as well as their proportions.

As the granulating agent, there may be used water-insoluble, oil-soluble addition polymers having a molecular weight (viscosity average) of at least 100,000, such as up to several million. Examples include polymers, either homopolymers or copolymers, of ($C_5$ to $C_{18}$)-alkyl methacrylates, vinyl ($C_6$ to $C_{18}$)-alkyl ethers, ($C_4$ to $C_{18}$)-alkyl vinyl sulfides and vinyl ($C_6$ to $C_{18}$)-alkanoates.

The preferred granulating agent is a linear polymer of a mixture of 1 to 30% of certain nitrogen-containing monoethylenically unsaturated monomers defined hereinafter with 99 to 70% respectively of at least one ester of the formula

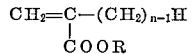

(I)

where $n$ is an integer having a value of 1 to 2, and
R is a ($C_1$–$C_{18}$)-alkyl group.

The copolymer contains sufficient groups R of sufficient size to render the copolymer soluble in the organic liquid medium employed as the polymerization medium. The size of the R groups and/or the proportion of large-sized R groups varies with the particular nitrogen-containing monomer with which it is copolymerized; but in general, as much as 50% by weight of the ester content may be formed of butyl esters provided the remaining ester content is formed with alcohols having at least 12 carbon atoms. A proportion of methyl ester monomers as high as 20% of the total ester content may be tolerated when the remainder of the ester monomers are formed from alcohols having at least 12 carbon atoms. Preferably, the entire ester content of the copolymer is formed with esters having at least 4 carbon atoms in the alcohol portion thereof. The viscosity average molecular weight should be at least 100,000 and may be as high as several million, a preferred size being about one million.

The nitrogen-containing monomers may be selected from any of those having the Formulas II, III, and IV hereinafter:

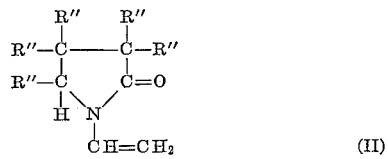

(II)

where the R''s are selected from the group consisting of hydrogen and lower alkyl groups preferably having 1 to 2 carbon atoms. The preferred N-vinyl pyrrolidinones have a total carbon content of not over about ten;

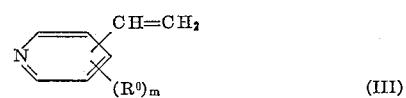

(III)

where $R^0$ is H or alkyl of 1 to 12 carbon atoms, and
$m$ is an integer having a value of 1 to 4;

(IV)

$$CH_2=C(R)AYNR'R^2$$

where

R is H or $CH_3$,
A is O,

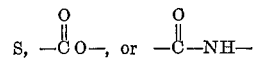

Y is an alkylene group having 2 to 8 carbon atoms,
R', when not directly attached to $R^2$, is phenyl, methylbenzyl, benzyl, cyclohexyl, or alkyl having 1 to 6 carbon atoms,
$R^2$, when not directly attached to R', is phenyl, methylbenzyl, benzyl, cyclohexyl, or alkyl having 1 to 6 carbon atoms, and
R' and $R^2$, when directly connected together, may be the morpholino residue —$C_2H_4OC_2H_4$—, the piperidino residue —$(CH_2)_5$—, or the pyrrolidino residue

The compounds of Formula II are called N-vinylpyrrolidones and sometimes N-vinylpyrrolidinones. Examples of the compounds of Formula II that may be employed include N-vinyl-2-pyrrolidinone itself, 3-methyl-1-vinyl-2-pyrrolidinone, 4-methyl-1-vinyl-2-pyrrolidinone, 5-methyl-1-vinyl-2-pyrrolidinone, 3 - ethyl-1-vinyl-2-pyrrolidinone, 3-butyl-1-vinyl-2-pyrrolidinone, 3,3-dimethyl-1-vinyl-2-pyrrolidinone, 4,4-dimethyl - 1 - vinyl-2-pyrrolidinone, 5,5-dimethyl-1-vinyl-2-pyrrolidinone, 3,3,5-trimethyl-1-vinyl-2-pyrrolidinone, 4-ethyl-1-vinyl-2-pyrrolidinone, 5-methyl-5-ethyl-1-vinyl-2-pyrrolidinone, 3,4,5-trimethyl-3-ethyl-1-vinyl-2-pyrrolidinone, and other lower alkyl substituted N-vinyl-2-pyrrolidinones.

Examples of compounds of Formula III that may be employed include 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 3-dodecyl-4-vinylpyridine; 2,4-dimethyl-5,6-dipentyl-3-vinylpyridine; 2-decyl-5-($\alpha$-methyl vinyl)-pyridine.

Examples of compounds of Formula IV that may be employed include 2-dimethylaminoethyl acrylate or methacrylate; 2-dimethylaminoethyl vinyl ether or sulfide; N-(2-dimethylaminoethyl)-acrylamide or methacrylamide; 2-diphenylaminoethyl acrylate or methacrylate; 2-diphenylaminoethyl vinyl ether or sulfide; N-(2-diphenylaminoethyl)-acrylamide or methacrylamide; 2-morpholinoethyl acrylate or methacrylate; 2-morpholinoethyl vinyl ether or sulfide; N-(2-morpholinoethyl)-acrylamide or methacrylamide; 2-piperidinoethyl acrylate or methacrylate; 2-piperidinoethyl vinyl ether or sulfide; N-(2-piperidinoethyl)-acrylamide or methacrylamide; 2-pyrrolidinoethyl acrylate or methacrylate; 2-pyrrolidinoethyl vinyl ether or sulfide; N-(2-pyrrolidinoethyl)-acrylamide or methacrylamide; 3-diethylaminopropyl acrylate or methacrylate; 3-diethylaminopropyl vinyl ether or sulfide; N-(3-diethylaminopropyl)-acrylamide or methacrylamide; 2-dibenzylaminopropyl acrylate or methacrylate; 2-dibenzylaminopropyl vinyl ether or sulfide; N-(2-dibenzylaminopropyl)-acrylamide or methacrylamide; 8-dimethylaminooctyl acrylate or methacrylate; 8-dimethylaminooctyl vinyl ether or sulfide; N-(8-dimethylaminooctyl)-acrylamide or methacrylamide.

It is essential that a granulating agent as defined hereinabove be employed in the polymerization medium to assure the formation of the polymer in particulate form. The polymerization medium is continuously or intermittently agitated during the entire time of polymerization so that the polymer forms as a particulate or granular polymer which is kept from agglomerating into a solid mass by the combined action of agitation and the granulating agent. After completion of polymerization, the system is cooled and the polymer which settles out on the ceasing of agitation is filtered off. If desired, the polymer may be purified by washing with a solvent for the organic liquid used as the continuous phase of the polymerization system which washing solvent, however, must also be non-solvent for the polymer. When a high boiling liquid is employed as the polymerization medium, a low boiling solvent may be used for rinsing the high boiling liquid off the polymer particles; and then after separation of the particulate polymer from the rinsing solvent, any residue of the latter on the polymer may be evaporated. Alternatively, purification of the recovered polymer may be effected simply by drying in a heated atmosphere or in a vacuum oven.

In the following examples which are illustrative of the present invention, the parts and percentages are by weight unless otherwise indicated. The granulating agents referred to in the examples are listed just below. The number average molecular weight of these granulating agents falls in the range of about 25,000±100,000 as determined by osmometry. Their weight average molecular weights, as estimated from light scattering data, are in the range of $1 \times 10^6 \pm 200,000$.

Agent A is a copolymer of vinyl pyridine 5%, butyl methacrylate 15%, lauryl methacrylate 50%, and stearyl methacrylate 30%.

Agent B is a copolymer of β-dimethylaminoethyl methacrylate 3%, butyl methacrylate 15%, lauryl methacrylate 52%, and stearyl methacrylate 30%.

Agent C is a copolymer of N-vinyl-2-pyrrolidinone 8%, butyl methacrylate 12%, lauryl methacrylate 50%, and stearyl methacrylate 30%.

Agent D is a copolymer of 10% N-vinyl-2-pyrrolidinone, 25% butyl acrylate, and 65% of a mixture of ($C_{12}$–$C_{18}$)-alkyl methacrylates obtained from a commercial cut of $C_{12}$–$C_{18}$ fatty alcohols.

Example 1

Six hundreds parts of a petroleum solvent having a boiling range of 148.90 to 210° C. (available under the trade name Varsol) was heated to reflux. Then 0.8 part of benzoyl peroxide and 2 parts of granulating agent D were added. Then 400 parts of methyl methacrylate were added over a two-hour period. After an additional four-hour period, the polymer system was cooled and filtered. An 80% yield of the poly(methyl methacrylate) was obtained in the form of a powder.

Example 2

(a) One hundred parts of the same petroleum solvent as used in Example 1 was mixed with 20 parts of β-ureidoethyl vinyl ether and 0.2 part of the same granulating agent as that used in Example 1. The mixture was heated to 110° C. to melt and disperse the monomer and copolymer. After cooling to 100° C., 0.2 part of dimethyl azodiisobutyronitrile was added. After two hours at 100° C., the particulate polymer of β-ureidoethyl vinyl ether is filtered. It was insoluble in acetone but soluble in water.

(b) The procedure of Example 1 is repeated using chlorobenzene (600 parts) in place of the Varsol.

Example 3

(a) The procedure of Example 1 was repeated except that the methyl methacrylate monomer contained 0.2 weight percent, based on monomer, of 2-mercaptoethanol. After completion of the polymerization, cooling, and filtering, the polymer was isolated as a white powder in good yield, about 75%. The polymer had the properties listed below; the comparison is made with a polymethyl methacrylate prepared in bulk at approximately 60° C. and also containing a corresponding amount of a mercaptan modifier.

| Property | Suspension Polymer | Bulk Polymer |
|---|---|---|
| Reduced Specific Viscosity | 0.047 | 0.045 |
| Approx. M.W. | 100,000 | 100,000 |
| Residual Monomer [1], percent | 1.52 | 2.1 |
| ASTM Flow Temp., ° C. | 135 | 158 |

[1] Pyridine sulfate dibromide method.

A series of polymers prepared in a similar manner were shown to have a viscosity range similar to that of bulk polymers and in all cases to have a lower ASTM flow temperature allowing easier molding. This property is attributed to a greater degree of atacticity or randomness in the polymer chain asosciated with the higher polymerization temperature. A particular utility of this invention is the fact that it allows the use of suspension polymerization temperatures in excess of 100° C. without the necessity of pressure. As the temperature of polymerization is increased, the degree of stereo-regularity in the polymer chain (degree of tacticity or order) decreases and eventually reaches complete randomness.

The degree of order in a polymer chain may be measured by a number of methods. Of special value in characterizing methyl methacrylate polymers is an empirical number designated as a "J" value (see, for example, the Journal of Polymer Science, Volume 31, Issue No. 122, p. 175 (1958)). J-values of about 30 and about 110 have been observed for two crystallizable forms of poly(methyl methacrylate). The higher the degree of atacticity or randomness, the closer the J-value approaches a value intermediate between 30 and 110.

A second criterion for atacticity is the inability to form a gel in dilute solution (5%) of 4-heptanone or to form gels with low melting points (<30° C.) when admixed with a crystallizable, type B (J-value about 30) poly-(methyl methacrylate).

A third criterion for atacticity is lack of an X-ray pattern, and a final criterion is complete solubility in a theta solvent, for example 4-heptanone.

By all of these tests the products of Example 3 are essentially atactic. The J-values obtained for the set of polymers varied from 79–88. None of the polymers showed any pattern in the X-ray, and all were soluble in 4-heptanone. Some gave gels when admixed with type B poly(methyl methacrylate) at 5% in 4-heptanone. In all cases these gels are unstable (melt) above 30° C.

The polymers of this example, prepared in the presence of a chain regulator, the mercaptan, show a marked improvement in resistance to thermal degradation, losing less than 5% of their original weight after 16 hours at 200° C. in an air oven. By contrast, an unmodified polymer may lose 60 to 70% of its original weight.

In place of the mercaptoethanol, other mercaptans may be used. Of particular utility are the tertiary-alkyl mercaptans, such as t-dodecyl mercaptan. The sulfur-containing chain-transfer agents that may be used also include 1-thio-2-hydroxypropane, 2-thio-1- hydroxypropane, 1-thio-2-hydroxy-n-butane, 2-thio-3-hydroxy-n-butane, 1-thio-4-hydroxy-n-butane, 1-thio-4-hydroxybutene-2, and 1-thiosorbitol. Another especially useful group of aliphatic thiols are the unsubstituted alkane thiols, for example, methyl mercaptan, n-propyl mercaptan, isopropyl mercaptan, n-butyl mercaptan, isobutyl mercaptan, amyl mercaptan, heptyl mercaptan, octyl mercaptan, nonyl mercaptan, hexadecyl mercaptan, pentadecane-thiol-8, ethane dithiol, 1,3-propane dithiol, 1,10-decane dithiol, and 1,12-octadecane dithiol. Other groups of useful aliphatic thiols are the mecapto-aliphatic acids, for example, thioglycolic and beta-mercapto-propionic acid, and the methyl and ethyl esters thereof. The proportion of chain regulator may be from 0.1 to 2% on the weight of monomer or monomers.

(b) In similar fashion, essentially atactic copolymers of 90 to 99% or more of methyl methacrylate with up to 10% by weight of styrene, vinyltoluene, ethyl acrylate, acrylonitrile, or ethyl methacrylate are prepared by the procedure of part (a) hereof. All are obtained as white powders characterized by ease of molding and thermal stability.

*Example 4*

150 parts of mineral spirits, having a boiling range of 120° to 140° C., was heated to reflux and one-half part of granulating agent A was added. A mixture of 35 parts of methyl methacrylate, 65 parts of ethyl methacrylate, and one-half part of benzoyl peroxide was added slowly to the system. The polymer was obtained in the form of small particles, which separated upon standing and cooling and could be isolated by filtration. The yield was approximately 85%.

*Example 5*

A mixture of octane, 200 parts, and one part of granulating agent B was heated to reflux. To this solution was added a mixture of acrylonitrile 60 parts, butyl acrylate 30 parts, and 0.4 part of benzoyl peroxide. The mixture was stirred annd heated for two hours. The polymer was isolated as a particulate solid in a yield of 70%.

*Example 6*

By the procedure of Example 5, but replacing granulating agent B with granulating agent C, a solution of 0.4 part of benzoyl peroxide, 0.4 part of lauroyl peroxide, and 85 parts of vinyl acetate was polymerized by heating and stirring at reflux for eight hours. The polymer was isolated as a free-flowing solid in 80% yield.

*Example 7*

By the procedure of Example 5, a mixture of 54 parts of acrylonitrile and 36 parts of 2-ethylhexyl acrylate was polymerized in refluxing octane for a period of two hours. Upon cooling, the polymer settled and could be removed by filtration. The yield was better than 80%.

*Example 8*

A mixture of 0.2 part of benzoyl peroxide, 45 parts of methyl methacrylate, and 45 parts of ethyl acrylate was added to a solution of 2 parts of granulating agent D in 185 parts of refluxing octane with stirring. The precipitated polymer was obtained in 90% yield.

*Example 9*

A mixture of one part of benzoyl peroxide, 225 parts of ethyl acrylate, and 225 parts of methacrylic acid was added to a refluxing solution of 10 parts of granulating agent C in 750 parts of toluene. The polymer was obtained as a solid in 85% yield. The polymer was readily soluble in dilute, aqueous alkali or dilute ammonia and showed a limited solubility in water.

*Example 10*

A mixture of 0.1 part of benzoyl peroxide, 20 parts of styrene, and 2.2 parts of divinylbenzene was added slowly to 2 parts of granulating agent C in 200 parts of octane at 100° C. The precipitated polymer could be readily isolated and was obtained in 70% yield. The polymer was insoluble in all common solvents.

*Example 11*

By a procedure similar to Example 10 but replacing the styrene with an equivalent amount of vinyltoluene, a polymer was obtained in 75% yield as a free-flowing solid. The polymer was insoluble in common solvents such as benzene, toluene, and ethylene chloride.

*Example 12*

Again by the procedure of Example 10, a mixture of styrene 17 parts, maleic anhydride 20 parts, and 0.4 part of azodiisobutyronitrile was added to 100 parts of octane and 1 part of granulating agent C at 100° C. with stirring for two hours. The precipitated polymer was isolated in almost quantitative yield.

*Example 13*

By the procedure of Example 11, alpha-methylstyrene was polymerized in octane to give a solid polymer in about 50% yield.

*Example 14*

A mixture of N-vinyl-2-pyrrolidinone 20 parts, and azodiisobutyronitrile was added to a solution of 2 parts of granulating agent A, in 100 parts of octane at 80° C. The polymer formed readily and was isolated by filtration of the cooled solution. The polymer was readily soluble in water.

*Example 15*

By the procedure of Example 14, but replacing the monomer of Example 14 and 20 parts of acrylamide, a polymer was obtained in good yield, approximately 80%. The polymer could be readily isolated by filtration and was soluble in water after removal of the organic solvent by drying at room temperature.

*Example 16*

A mixture of 400 parts of methyl methacrylate, 600 parts of Varsol, 0.8 part of benzoyl peroxide, and 7.2 parts of granulating agent D is charged into a polymerization reactor and heated to reflux within a period of one-half hour. The polymerization medium was then maintained at reflux by appropriate cooling and/or heating as required for an additional 3½ hours. The polymer was obtained in an 80% yield as an easily filterable material. It had a viscosity of about 47 poises at 29% in toluene at 25° C.

I claim:

1. In a process for the polymerization in a liquid medium of ethylenically unsaturated monomeric molecules having a $H_2C=C<$ group to form a polymer insoluble in the medium by heating the molecules in the liquid medium containing dissolved therein a free-radical initiator and from 0.1 to 2% by weight, based on the weight of monomer molecules, of a granulating agent, the amount of monomer molecules being from 1 to 60% by weight of the mixture thereof with the organic solvent medium, the improvement characterized in that the liquid medium is an organic non-aqueous water-immiscible inert liquid medium boiling in the range of 40° to 200° C. in which the polymer formed from the monomeric molecules is insoluble, the temperature of the medium is maintained in the range of 40° to 200° C., and the granulating agent is a water-insoluble copolymer, having a molecular weight of at least 100,000, of a mixture of (a) 99 to 70% by weight of at least one ester of the formula

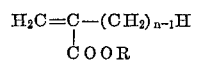

wherein
n is an integer having a value of 1 to 2, and
R is a ($C_4$–$C_{18}$)-alkyl group, the R groups being of such size that the copolymer is soluble in the medium, and (b) 1 to 30% by weight of at least one nitrogen-containing compound selected from the group consisting of those having the Formulas II, III, and IV following:

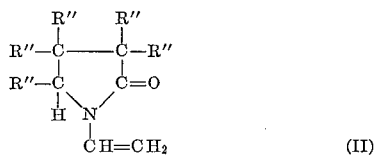
(II)

where
each of the R″ groups is selected individually from the group consisting of hydrogen and lower alkyl groups,

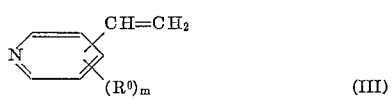
(III)

where
$R^0$ is selected from the group consisting of H and alkyl groups of 1 to 12 carbon atoms, and is an integer having a value of 1 to 4, $$H_2C=C(R)AYNR'R^2 \quad (IV)$$

wherein
R is selected from the group consisting of H and $CH_3$,
A is selected from the group consisting of O, S,

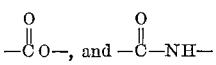

Y is an alkylene group having 2 to 8 carbon atoms,
R′, when not directly attached to $R^2$, is selected from the group consisting of phenyl, methylbenzyl, benzyl, cyclohexyl, and alkyl groups having 1 to 6 carbon atoms,
$R^2$, when not directly attached to R′, is selected from the group consisting of phenyl, methylbenzyl, benzyl, cyclohexyl, and alkyl groups having 1 to 6 carbon atoms, and
R′ and $R^2$, when directly connected together, are selected from the group consisting of the morpholino residue, the piperidino residue, and the pyrrolidino residue.

2. A process as defined in claim 1 in which the organic, non-aqueous liquid medium comprises liquids selected from the group consisting of hydrocarbons and halogenated hydrocarbons.

3. A process as defined in claim 1 in which the monomeric molecules comprise methyl methacrylate.

4. A process as defined in claim 1 in which at least some of the monomeric molecules are water-soluble.

5. A process as defined in claim 1 in which at least some of the monomeric molecules are water-soluble monomers selected from the group consisting of acrylamide, methacrylamide, acrylic acid, methacrylic acid, maleic anhydride, N-vinyl-2-pyrrolidinone, β-ureidoethyl vinyl ether, and β-dimethylaminoethyl acrylate.

6. A process as defined in claim 1 in which the monomeric molecules comprise methyl methacrylate and ethyl methacrylate.

7. A process as defined in claim 1 in which the monomeric molecules comprise methyl methacrylate and ethyl acrylate.

8. A process as defined in claim 1 in which the monomeric molecules comprise acrylonitrile and an ester of acrylic acid.

9. A process as defined in claim 1 in which the monomeric molecules comprise methacrylic acid.

10. A process as defined in claim 1 in which the monomeric molecules comprise ethyl acrylate and methacrylic acid.

11. A process as defined in claim 1 in which the monomeric molecules comprise vinyltoluene.

12. A process as defined in claim 1 in which the polymerization medium also contains from 0.1 to 2% by weight, based on the weight of monomer molecules, of an aliphatic thiol as a chain-transfer agent.

13. In a process for the polymerization in a liquid medium of ethylenically unsaturated monomeric molecules having a $H_2C=C<$ group to form a polymer insoluble in the medium by heating the molecules in the liquid medium containing dissolved therein a free-radical initiator and from 0.1 to 2% by weight, based on the weight of monomer molecules, of a granulating agent, the amount of monomer molecules being from 1 to 60% by weight of the mixture thereof with the organic solvent medium, the improvement characterized in that the liquid medium contains dissolved therein, 0.1 to 2% by weight, based on monomer weight, of an aliphatic thiol as a chain-transfer agent, the monomer molecules consist of at least one monomer selected from the group consisting of methyl methacrylate, ethyl acrylate, styrene, ethyl methacrylate, and acrylonitrile, the methyl methacrylate monomer constituting from 90 to 100% by weight of the unsaturated molecules, the liquid medium is an organic non-aqueous water-immiscible inert liquid medium selected from the group consisting of hydrocarbons and halogenated hydrocarbons boiling in the range of 110° to 200° C. in which the polymer formed from the monomeric molecules is insoluble, the temperature of the medium is maintained in the range of 110° to 200° C., and the granulating agent is a water-insoluble copolymer, having a molecular weight of at least 100,000, of a mixture of (a) 99 to 70% by weight of at least one ester of the formula

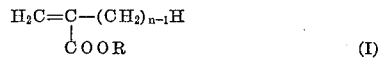
(I)

wherein
n is an integer having a value of 1 to 2, and R is a ($C_4$–$C_{18}$)-alkyl group, the R groups being of such size that the copolymer is soluble in the medium, and (b) 1 to 30% by weight of at least one nitrogen-containing compound selected from the group consisting of those having the formulas II, III, and IV following:

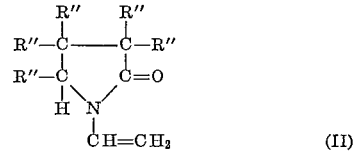
(II)

where
each of the R″ groups is selected individually from the group consisting of hydrogen and lower alkyl groups,

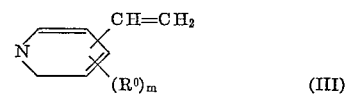
(III)

wherein
$R^0$ is selected from the group consisting of H and alkyl groups of 1 to 12 carbon atoms, and
m is an integer having a value of 1 to 4,

(IV)

wherein
R is selected from the group consisting of H and $CH_3$,

A is selected from the group consisting of O, S, $-\overset{O}{\underset{\|}{C}}O-$, and $-\overset{O}{\underset{\|}{C}}-NH-$ Y is an alkylene group having 2 to 8 carbon atoms,
R', when not directly attached to $R_2$, is selected from the group consisting of phenyl, methylbenzyl, benzyl, cyclohexyl, and alkyl groups having 1 to 6 carbon atoms,
$R^2$, when not directly attached to R', is selected from the group consisting of phenyl, methylbenzyl, benzyl, cyclohexyl, and alkyl groups having 1 to 6 carbon atoms, and
R' and $R^2$, when directly connected together, are selected from the group consisting of the morpholino residue, the piperidino residue, and the pyrrolidino residue.

References Cited by the Examiner

UNITED STATES PATENTS

| | | | |
|---|---|---|---|
| 2,497,705 | 2/1950 | Werntz | 260—88.3 |
| 2,744,291 | 5/1956 | Stastny et al. | 260—88.3 |
| 2,870,118 | 1/1959 | Bader et al. | 260—89.5 |
| 2,888,410 | 5/1959 | Buchholz | 260—86.1 |
| 2,895,938 | 7/1959 | Ohlinger et al. | 260—85.5 |

FOREIGN PATENTS 736,620    9/1955    Great Britain.

JOSEPH L. SCHOFER, *Primary Examiner.*

MILTON STERMAN, HAROLD N. BURSTEIN, LEON J. BERCOVITZ, *Examiners.*